US006891878B2

(12) United States Patent
Spariosu et al.

(10) Patent No.: US 6,891,878 B2
(45) Date of Patent: May 10, 2005

(54) EYE-SAFE SOLID STATE LASER SYSTEM AND METHOD

(75) Inventors: Kalin Spariosu, Thousand Oaks, CA (US); Milton Birnbaum, Rancho Palos Verdes, CA (US)

(73) Assignee: Raytheon Company, Waltham, MA (US)

( * ) Notice: Subject to any disclaimer, the term of this patent is extended or adjusted under 35 U.S.C. 154(b) by 111 days.

(21) Appl. No.: 10/429,102

(22) Filed: May 1, 2003

(65) Prior Publication Data

US 2004/0218652 A1 Nov. 4, 2004

(51) Int. Cl.[7] .............................. H01S 3/09; H01S 3/082
(52) U.S. Cl. ........................................... 372/70; 372/97
(58) Field of Search ........................... 372/9–17, 69–75, 372/97, 39

(56) References Cited

U.S. PATENT DOCUMENTS

| | | | | |
|---|---|---|---|---|
| 5,123,026 A | * | 6/1992 | Fan | |
| 5,173,911 A | * | 12/1992 | Faure | |
| 5,227,913 A | * | 7/1993 | Gill | |
| 5,359,616 A | * | 10/1994 | Yasui | |
| 5,402,434 A | * | 3/1995 | Saito | |
| 5,557,624 A | * | 9/1996 | Stultz | |
| 6,002,704 A | * | 12/1999 | Tuennermann | |
| 6,373,865 B1 | | 4/2002 | Nettleton et al. | ............. 372/10 |
| 2002/0101893 A1 | * | 8/2002 | Betin | |

FOREIGN PATENT DOCUMENTS

WO    WO 2003/001247 A  *  1/2003

OTHER PUBLICATIONS

Spariosu & Birnbaum, "Upconversion effects on Er:YAG laser dynamics", SPIE vol. 2115, 1994, pp. 45–51, no month.
T. Schweizer, T. Jensen, E. Heumann, and G. Huber, "Spectroscopic properties and diode pumped 1.6 mm performance in Yb–codoped Er:Y3A15O12 and Er:Y2SiO5",Optics Communications, 118, 557–561 (1995), no month.
K. Spariosu, M. Birnbaum, and B. Viana, Er3+:Y3A15O12 laser dynamics: effects of upconversion J. Opt. Soc. Am. B, 11(5), 894–900, (1994), May 1994.
K. Spariosu and M. Birnbaum, "Intracavity 1.549 mm pumped 1.634 mm Er:YAG Lasers at 300 K", IEEE J. Quantum Electron. 30(4), 1044–1049, (1994), Apr. 1994.

* cited by examiner

*Primary Examiner*—Quyen Leung
(74) *Attorney, Agent, or Firm*—John E. Gunther; Leonard A. Alkov; Karl A. Vick (57) ABSTRACT

An inherently efficient direct eye-safe laser based on Er:Crystal technology utilizing intra-cavity energy conversion. The Er:Crystal laser is intra-cavity pumped by a highly efficient ytterbium or neodymium crystal laser, which is in-turn, pumped by conventional infrared diodes array bars. The laser is inherently compact and low-cost allowing for significant scaling of the output energy and power with greatly reduced number of required diode pump sources. This intra-cavity pump scheme of appropriate Er:Crystals also provides for efficient generation of ultra-short Q-switched pulse operation of such lasers.

30 Claims, 4 Drawing Sheets

EYE-SAFE SOLID STATE LASER SYSTEM AND METHOD

BACKGROUND OF THE INVENTION

1. Field of the Invention

The present invention relates to lasers. More specifically, the present invention relates to eye-safe lasers.

2. Description of the Related Art

Solid-state lasers often employ a doped-insulator lasing medium. Both glass and crystal mediums have been used. The input power source to the lasing medium is pumplight energy, which is optically coupled into the doped medium. The pumplight energy may be derived from high power light emitting diode arrays, flash lamps or other sources. The pumplight energy raises the energy level of dopant ions within the lasing medium.

Lasing mediums used in accordance with the prior art often include dopant ions dispersed within the host glass or crystal. For example, ytterbium doped yttrium aluminum garnet (Yb:YAG), neodymium doped yttrium aluminum garnet (Nd:YAG) or erbium doped yttrium aluminum garnet or glass (Er:YAG, Er:Crystal Er:Glass). Solid state lasers have been devised that are comprised of a single oscillator/output stage or an oscillator stage followed by one or more amplifier stages.

In each amplifier stage of a laser system, a laser beam from an oscillator or previous amplifier stage is directed into an entrance end of a gain medium. The driving laser beam is directed through the medium and a lasing action occurs when the dopant ions release energy to the beam as they revert to their previous stable low-energy state. A portion of the energy released is converted into light and results in an energy gain in the laser beam traversing the slab. In single stage oscillator lasers, the output beam is taken directly from the oscillator stage.

Solid state lasers have been designed to operate at various wavelengths, with the infrared bands proving to be particularly useful. At any given wavelength, there is some level of fluence, or energy, that represents a threshold of damage to the human retina. However, the band of wavelengths from about 1.4 microns to 1.8 microns has been shown to require energy levels that are several orders of magnitudes greater before the threshold of eye-damage is reached. In fact, this band has been deemed the "eye-safe" band by certain US government agencies. Thus, in operational environments where humans are present, eye-safe lasers are preferred because significantly higher laser beam fluences are permissible.

It is naturally desirable that lasers be designed for maximum efficiency while still meeting target cost and reliability constraints. Two important aspects of system efficiency are the electrical-to-optical efficiency of the pumplights and the conversion efficiency of the lasing medium. An important conversion efficiency measure in diode pumped solid-state lasers is the "quantum defect" of the system. Quantum efficiency is essentially controlled by the wavelength difference between the pump light energy and the laser beam produced. Basically, quantum defect is determined by subtracting the wavelength of the emitter light from the wavelength of the pump light, normalized within the wavelength of the pump light. This yields the so-called quantum defect, as a percentage, which is the theoretically highest efficiency realizable from the systems.

Clearly then, a system in which the pump light wavelength is close to the laser wavelength is preferred from an efficiency perspective. For example, in the case of a one micron Nd:YAG laser pumped by 800 nanometer pump light diodes, a quantum efficiency of less than 80% is realized. In another example in the prior art, a resonantly pumped laser, such as a Yb:YAG laser, which employs 940 nanometer diodes and lases at 1 micron, will yield a quantum efficiency that is greater than 90%. Therefore, everything else being equal, it is preferable that the pumplight wavelength be as close to the lasing wavelength as practicable. There are other factors supporting this desirability as well. For example, ultimately, the difference in the energy between the pumplight and the laser determines the heat loading of the lasing medium, which limits maximum beam output power.

With respect to eye-safe lasers designed to emit in the 1.4 to 1.8 micron band, it is preferable to employ pump light diodes near the laser wavelength However, implementation of an efficient direct resonantly pumped laser, such as an Er:Crystal laser, has been limited by the lack of affordable high power 1500 nanometer diode arrays. Conversely, efficient diode pumped Nd:YAG lasers, as well as Yb:YAG lasers are readily available with commercial off-the-shelf high power 800 nanometer or 940 nanometer diode sources. Thus, the economics of available solid state pumplight sources in the eye-safe wavelength range has caused designers of prior art eye-safe laser to seek an alternate path in system design.

The basic approach to prior art eye-safe laser design has been to employ an efficient resonantly pumped 1 micron laser and a non-linear device that shifts, or converts, the laser beam wavelength into the eye-safe region of the spectrum. Two available non-linear conversion devices are the RAMAN cell and optical parametric oscillators ("OPO"). Thus, prior art eye-safe lasers employ indirect conversion as opposed to direct conversion. Direct conversion means there is a laser medium, such as Nd:YAG or Yb:YAG, in which the pumplight energy is directly converted to the laser beam wavelength within the lasing medium through the lasing action. An Nd:YAG laser employs a laser transition that lases at 1.064 micron with 840–900 nanometer pumplight source. Thus, when the laser medium is excited, it lases directly at 1.064 micron. However, in the case of the eye-safe band, it is not possible to get the Nd:YAG medium lase directly at 1.5 micron. Therefore, the aforementioned non-linear conversion medium is added to the system. In prior art eye-safe lasers, the non-linear conversion medium converts the 1 micron radiation to 1.5 micron. The non-linear conversion process can be accomplished in various mediums, including solid crystal, liquid, or gaseous mediums. For example, methane can be used to produce the 1.5 micron wavelength.

Because of the aforementioned design and cost trade-off, one current state-of-the-art eye-safe laser design is based on OPO-shifted Nd:YAG lasers configured as a mono-block solid-state structure, which is taught in U.S. Pat. No. 6,373,865 dated Apr. 16, 2002 to Nettleton for PSEUDO-MONOLITHIC LASER WITH INTRACAVITY OPTICAL PARAMETRIC RESONATOR, the teachings of which are hereby incorporated by reference. This design generally has good efficiency, however, it is inherently bulky and cumbersome because it requires several high-power diode bars to enable it to operate with an appreciable energy output. Furthermore, OPO based energy conversion is inherently inefficient and suffers from compromised beam quality. Direct eye-safe lasers based on erbium dopants are also known in the art. Erbium (Er) lasers utilize a ytterbium-erbium energy transfer pumping mechanism in a phosphate-glass host. However, the glass host is severely power-limited by its poor thermal properties such that operating these lasers at higher average powers is prohibited. Attempts to reproduce this functional ytterbium-erbium energy transfer pumping process in a crystal host (such as YAG) has resulted in a severely limited laser performance. This limitation is articulated in the reference by T. Schweizer, T. Jensen, E. Heumann, and G. Huber, "Spectroscopic properties and diode pumped 1.6 $\mu$m performance in Yb-codoped Er:$Y_3Al_5O_{12}$ and Er:$Y_2SiO_5$", Optics Communications, 118, 557–561 (1995). This is due to the fact that the energy level dynamics of erbium in a crystal host is much less favorable than that in phosphate glass.

Thus, there is a need in the art for a system and method to produce an eye-safe laser that offers the performance characteristics of the Nd:YAG laser while still efficiently producing an eye-safe beam utilizing an intra-cavity energy conversion that is inherently compact and low-cost allowing for significant scaling of the output energy and power with greatly reduced numbers of diode pumplight sources.

SUMMARY OF THE INVENTION

The need in the art is addressed by the apparatus and methods of the present invention. A pumplight driven solid-state eye-safe laser is taught. The laser includes a first lasing medium that operates to lase energy, at a first wavelength as a result of absorbing pumplight energy. A second lasing medium is coupled with the first lasing medium, and together defining a first resonant cavity for reflectively retaining the first wavelength energy. The second lasing medium operates to lase energy in the eye-safe band of wavelengths as a result of absorbing the first wavelength energy. A transmissive/reflective layer is disposed along the coupling between the first lasing medium and the second lasing medium, and the layer is transmissive at the first wavelength, but reflective at the second wavelength. This arrangement defines a second cavity for reflectively retaining the second wavelength within the second lasing medium. An output coupler is disposed at an end of the second lasing medium opposite the transmissive/reflective layer. The output coupler is at least partially reflective at the second wavelength. A Q-switch may be disposed between the second lasing medium and the output coupler. The Q-switch is absorptive at the second wavelength until switched to a transmissive state, thereby allowing the second wavelength energy to exit the second cavity as an eye-safe laser beam.

In a specific embodiment, the first and second lasing mediums are solid state materials. The first lasing medium may be neodymium ion doped yttrium aluminum garnet, with a pumplight wavelength of approximately eight hundred nanometers. Or, the first lasing medium may be ytterbium ion doped yttrium aluminum garnet with a pumplight wavelength of approximately nine hundred and forty nanometers. The second lasing medium may be erbium ion doped crystal such as yttrium aluminum garnet. More generally, the second lasing medium may be erbium ion doped into a host material that is selected from one of $Sc_2SiO_7$; $Sc_2SiO_5$; $Y_2SiO_5$; $Ca_2Al_2SiO_7$; $YVO_4$, or $BeAl_2O_4$.

Respecting the system light wavelengths, first wavelength maybe approximately 1 micron, and the second wavelength may be approximately 1.5 microns. Generally, for eye-safe operation, the second wavelength is in the range from approximately 1.4 microns to 1.8 microns. In a specific embodiment, the pumplight energy is provided by a high power diode bar array. The pumplight energy may be pulsed. The laser may operate in a pulsed mode of operation.

In a refinement of the foregoing invention, the output coupler is a Q-switch, which may be a cobalt crystal Q-switch. The transmissive/reflective layer is a dielectric coating in a specific embodiment. In another refinement, a dielectric coating that is reflective at the first wavelength is positioned at the opposite end of the first lasing medium from the transmissive/reflective layer. In a further refinement, a dielectric coating that is reflective at the first wavelength and transmissive at the second wavelength is disposed between the second lasing medium and the output coupler.

An illustrative embodiment teaches a specific solid-state eye-safe laser. The laser is driven by a pumplight array of high power light emitting diodes that emit pulsed energy at a wavelength of approximately 940 nanometers. A first lasing medium formed from solid state ytterbium ion doped yttrium aluminum garnet operates to lase energy at a first wavelength of approximately one micron as a result of absorbing the pumplight energy. A second lasing medium formed from erbium ion doped crystal such as yttrium aluminum garnet is coupled with the first lasing medium. Together, they define a first resonant cavity for reflectively retaining the first wavelength energy therein. The second lasing medium operates to lase energy at approximately 1.5 to 1.6 microns as a result of absorbing the first wavelength energy. A first dielectric coating is disposed along the coupling between the first lasing medium and the second lasing medium. The first dielectric coating is transmissive at the first wavelength and reflective at the second wavelength. Thus, defining a second cavity for reflectively retaining the second wavelength within the second lasing medium. A second dielectric coating that is reflective at the first wavelength is positioned at the opposite end of the first lasing medium from the first dielectric coating. And, a third dielectric coating that is reflective at the first wavelength and transmissive at the second wavelength is disposed at the opposite end of the second lasing medium from the first dielectric coating. Finally, a cobalt crystal Q-switch is disposed at the end of the second lasing medium beyond the third dielectric coating. The Q-switch is absorptive at the second wavelength until switched by bleaching action to a transmissive state. Once bleached, or switched, the Q-switch allows the second wavelength energy to exit the second cavity as a pulse of laser light.

The present invention also teaches a method of producing a pumplight driven eye-safe laser beam. The method utilizes a first and second lasing mediums with a transmissive/reflective layer disposed therebetween, a Q-switch, and an output coupler. The method includes the steps of lasing the first lasing medium to produce energy at a first wavelength through absorption of the pumplight energy. And, reflectively retaining the first wavelength energy in the resonant cavity defined by the extent of the first and second lasing medium. Next, lasing the second lasing medium to produce energy at a second wavelength within in the eye-safe band of wavelengths, through absorption of the first wavelength energy by the second lasing medium. Also, reflectively retaining the second wavelength energy in the second resonant cavity formed between the transmissive/reflective layer at one end of the second lasing medium and the output coupler at the opposite end of the second lasing medium. The transmissive/reflective layer is transmissive at the first wavelength and reflective at the second wavelength. Finally, switching the Q-switch from a reflective state to a transmissive state, thereby emitting the second wavelength energy.

In a specific embodiment, the first and second medium lasing steps occur in solid state materials. In particular, the first lasing step may occur in a medium that is neodymium ion doped yttrium aluminum garnet with the pumplight wavelength at approximately eight hundred nanometers. Alternatively, the first lasing step may occur in a medium that is ytterbium ion doped yttrium aluminum garnet with the pumplight wavelength at approximately nine hundred and forty nanometers. The second lasing step may occur in a medium that is erbium ion doped crystal such as yttrium aluminum garnet. The first wavelength maybe approximately 1 micron, and the second wavelength may be approximately 1.5 microns. Generally, the second wavelength is in the eye-safe range from approximately 1.4 microns to 1.8 microns In a specific embodiment of the foregoing method, the pumplight energy is coupled from a high power diode bar array. The method may also include the step of pulsing the pumplight energy. The switching step may be accomplished using a Q-switch. The transmissive/reflective layer may be a dielectric coating. The method may further include the step of pulsing the laser with plural repetitions of the switching step.

DESCRIPTION OF THE INVENTION

Illustrative embodiments and exemplary applications will now be described with reference to the accompanying drawings to disclose the advantageous teachings of the present invention.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

The prior art includes certain direct and indirect solid-state eye-safe laser technologies. Direct conversion eye-safe lasers have been employed using erbium only or erbium and ytterbium doped phosphate glass technology. Erbium-only lasers require pumplight diodes that operate at approximately 1500 nanometers, which are not available with efficiency, power and performance characteristics that compete with GaAs diodes in the 800 to 940 nanometer range. Erbium-ytterbium doped glass lasers utilize reasonably low cost GaAs technology diode arrays in the 800 to 940 nanometer band, but suffer from several fundamental problems that limit their scaling and applications, which will be discussed hereinafter. Prior art indirect conversion eye-safe lasers employ neodymium or ytterbium doped yttrium aluminum garnet laser mediums, which output 1 micron laser energy when excited with 800 to 940 nanometer diode arrays. A non-linear conversion device is added, such a RAMAN cell or OPO, to shift the energy from 1 micron into eye-safe wavelengths of 1.4 micron to 1.8 microns.

Figure 1:
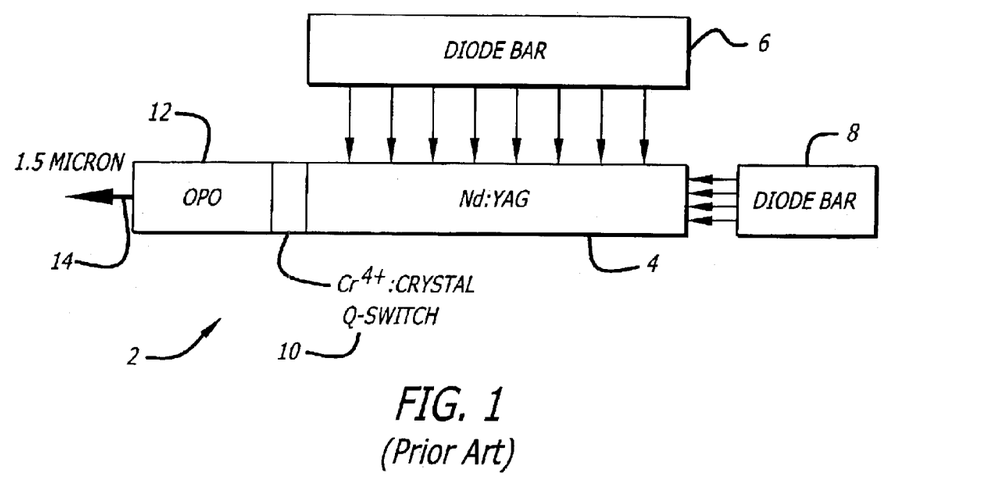
FIG. 1 is a functional block diagram of a prior art mono-block solid-state eye-safe laser.

The current state-of-the-art in eye-safe lasers for a variety of tactical, large standoff, applications are OPO-shifted Nd:YAG lasers. However, in spite of these lasers' excellent efficiency, they are inherently bulky and cumbersome, as they typically require many diode array bars to operate with an appreciable energy output level. Furthermore, energy conversion based on the OPO is inherently inefficient and suffers from compromised beam quality. FIG. 1 illustrates a prior art mono-block eye-safe laser, as taught in the aforementioned Nettleton reference. The Nd:YAG lasing medium 4 is driven by plural diode pumplight arrays, or bars 6, 8. The diode bars can be edge pumped 6 or end pumped 8, or both. A $Cr^{4+}$:YAG Q-switch 10 is used to allow energy levels in the lasing medium to resonate and gain until the $Cr^{4+}$ ions in the Q-switch are bleached, emitting the laser beam energy from the gain medium 4. Q-switch theory and operation are known to those skilled in the art. An optical parametric oscillator ("OPO") 12 is used to convert the beam energy from 1 micron to 1.5 microns. OPO devices are known to those skilled in the art.

With regard to the specific operational characteristics of a mono-block laser 2, such as illustrated in FIG. 1, neodymium has a laser transition that lases at 1.064 micron when excited with 840–900 nanometer pumplight. However, it is extremely inefficient to cause neodymium to lase directly in the eye-safe band. There must be an external, non-linear medium, through which the 1 micron radiation can be converted to 1.5 micron. In FIG. 1, the OPO 12 accomplishes this function. Generally, this is a non-linear process, which can occur in a solid crystal, a liquid or a gaseous medium. For example, methane can be used to produce the 1.5 micron wavelength. In contrast, Erbium lasers can lase inherently (directly) in the eye-safe region. For example, in the Er:YAG crystal, the laser beam is slightly shifted to the red, and lases at about 1.6 microns. In glass mediums, 1.5 micron beams are produced.

In applications of Nd:YAG mono-block laser, as illustrated in FIG. 1, even with efficient high power 800 nanometer diode bars, the short upper-state lifetime of the neodymium ion results in overall poor energy storage of the laser. Therefore, with a single 800 nanometer diode pumplight bar, pulse energy output on the order of a single millijoule is the best that can be achieved. If more pulse energy is required, then the number of diode bars must be multiplied. This results in a high cost array to achieve these energy levels. The other way to achieve greater pulse energy is by using flash lamp light pumping. However, flash lamp pumped mono-block lasers have limitations on the repetition rate that can be applied. Diode array pumplight can achieve repetition rates in the range of tens of hertz to over 100 hertz.

The Nd:YAG, OPO shifted laser is referred to as a mono-block laser because of its construction. It is called a mono-block because it is cemented or fused together into a monolithic unit. The structure begins with a monolithic rail of undoped YAG, onto which all of the other doped crystals are bonded, and so forth. The mono-block is a relatively rugged unit. Because of the nature of Q-switch operation and operational environmental variables, there are significant inconsistencies in pulse-to-pulse pulse widths and output energies. Mono-block laser beam divergence is also not as narrow as other technologies. Excessive beam divergences can result from the use of non-linear converters, such as the OPO. This is why designers prefer not to use non-linear devices if at all possible. In fact, non-linear devices are frequently "show-stoppers" when it comes to achieving a high quality, single mode, diffraction-limited laser beam. This is important because the more diffraction-limited the beam is, the less energy is required to meet the targeting and rangefinding requirements of the system.

Since a direct conversion laser is preferred from the standpoint of beam quality, as well as other design and manufacturing reasons, it is reasonable to consider the issue of pumplight sources that would enable direct laser operation in the eye-safe band. For example, Erbium ion lasers can lase directly in the eye-safe band if pumped with 1500 nanometer sources. However, available pumplight wavelengths are a matter of semiconductor physics and manufacturability issues. Light emitting diodes are available in a wide choice of spectrums and bands. GaAs and GaAlAs diodes are available in the range from 750 to 980 nanometers. These are available as low cost commercial, off-the-shelf devices, and operate at high power levels. For example, 808 nanometer diodes are typically used in the neodymium lasers. Also 940 nanometer diodes are typically used for ytterbium lasers. To produce diodes suitable for a direct conversion eye-safe laser, designers need diodes that operate at approximately 1500 nanometers. Different semiconductor materials are needed to produce this wavelength. Certain materials are known, which include indium-gallium-aluminum and indium phosphide diodes. However, these materials are not as readily available as GaAs technology. And, even if such materials were readily available, there are other mitigating issues that surround their use. Generally, these materials do not perform nearly as well as GaAs materials. For example, in a one-to-one comparison of diode-to-diode or bar-to-bar, there is a factor of four times in power. Given a fixed amount of drive current, a 940 nanometer diode will produce four times more light than a 1500 nanometer diode. Also, from a robustness point of view, GaAs products are superior. And, cost is lower for the 940 nm diodes as well.

Figure 2:
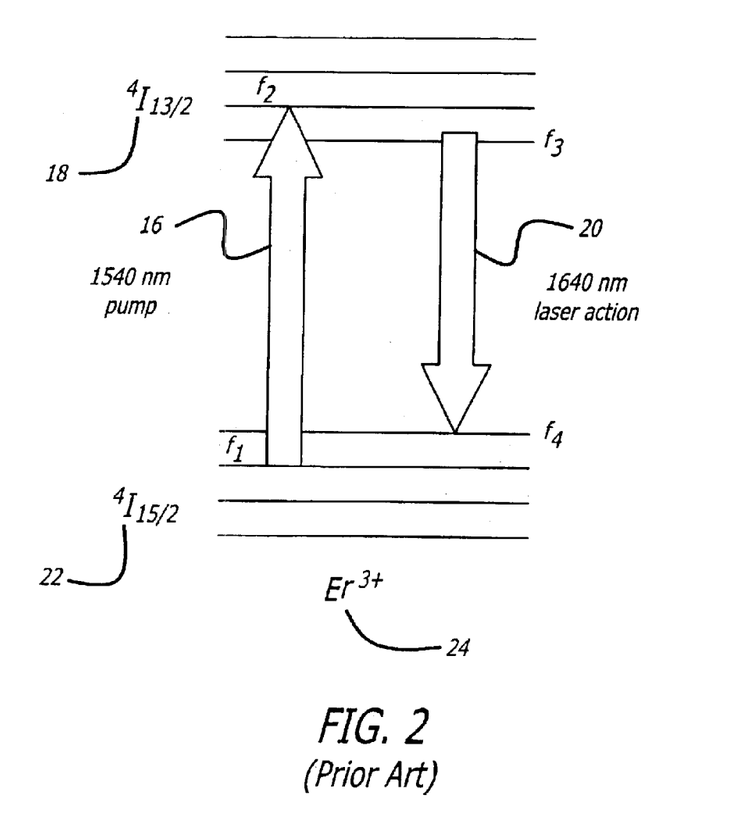
FIG. 2 is a laser pump scheme diagram of a prior art direct conversion erbium eye-safe laser.

Reference is directed to FIG. 2, which is a laser pump scheme diagram for a prior art direct conversion erbium eye-safe laser. The laser employs the erbium ion 24 that is dispersed into a YAG medium. A 1540 nanometer laser pump source 16 populates the $^4I_{15/2}$ erbium energy level 22 by exciting the $^4I_{13/2}$ erbium energy level 18. The resultant laser action 20 produces energy at 1640 nanometers. This is a resonantly pumped Er:YAG laser and can produce slope efficiencies as high as 50% in a standard as well as an intra-cavity pumped configuration. See generally the references; K. Spariosu, M. Birnbaum, and B. Viana, "Er$^{3+}$: Y$_3$Al$_5$O$_{12}$ laser dynamics: effects of upconversion", J. Opt. Soc. Am. B, 11(5), 894–900, (1994), and K. Spariosu and M. Birnbaum, "Intracavity 1.549 $\mu$m pumped 1.634 $\mu$m Er:YAG Lasers at 300 K", IEEE J. Quantum Electron. 30(4), 1044–1049, (1994). The pump energy is efficiently converted by the Er:Crystal host. This pumping scheme boasts high efficiency and excellent thermal dissipation due to a very small quantum defect. However, the lack of efficient high power diode sources at these wavelengths has thus far limited the implementation of this type of laser. In addition, because of the resonant pumping approach, which relies on the favorable Stark energy level configuration in the lower energy level manifold, the inversion density that can be achieved is limited by the bleaching of this resonance. It can be shown that, expressed in terms of the total ion density, the maximum population inversion that can be achieved with this type of pumping is as shown in Equation 1, below:

$$N = \frac{f_1 f_3 - f_2 f_4}{f_1 + f_2} \quad \text{Eq. 1}$$

This maximum inversion density in Er:YAG, for example, turns out to be about $0.1N_T$ for the pump wavelength of 1540 nm.

An alternate pumping approach would be to excite the $^4I_{11/2}$ erbium energy level which would then populate the upper $^4I_{13/2}$ erbium energy level manifold potentially achieving a much higher inversion density for the 1600 nanometer laser action. One such excitation approach is the ytterbium-erbium energy transfer, which is a well established technique for pumping the Yb,Er:Glass lasers. This approach is illustrated in FIG. 3.

Figure 3:
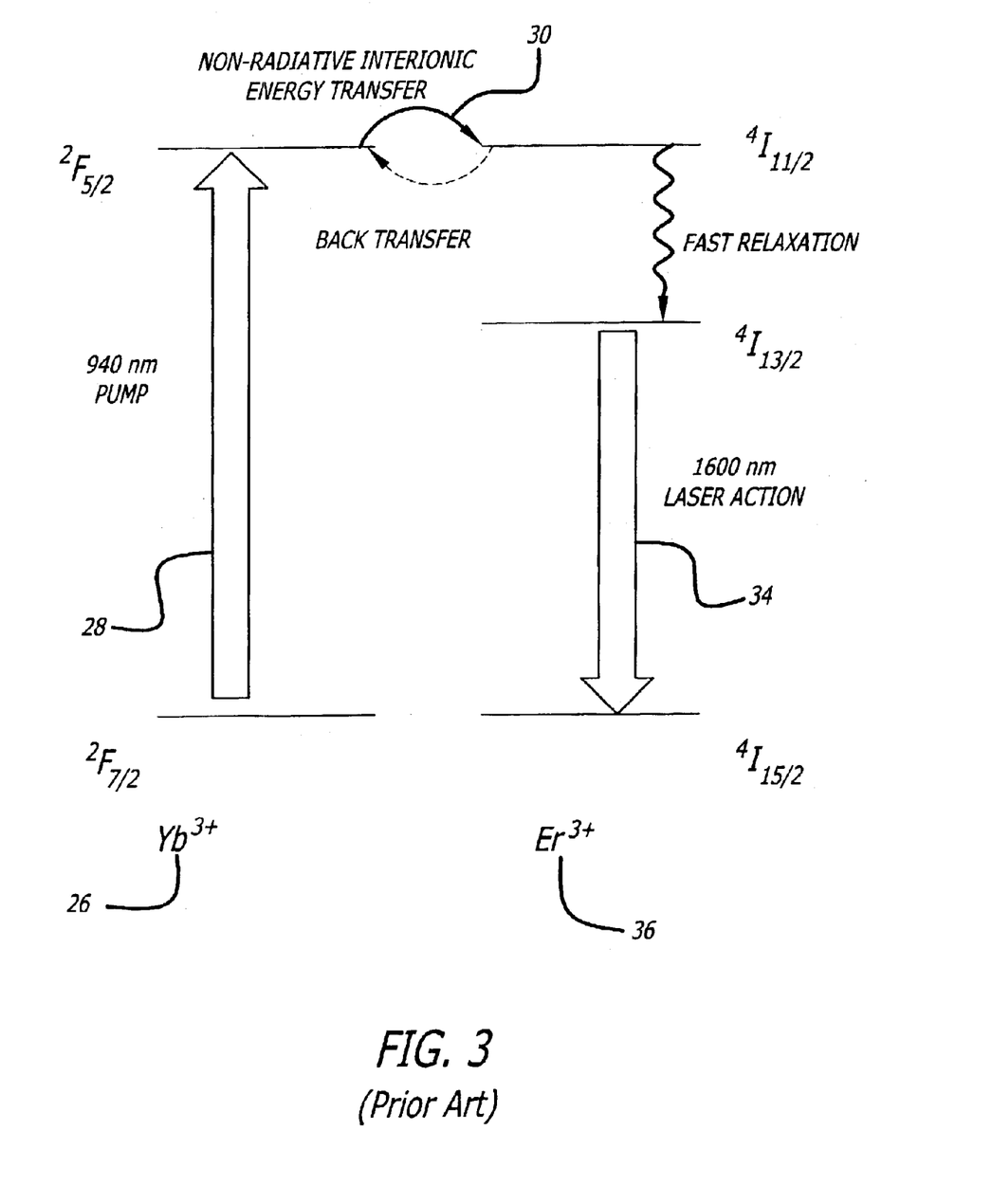
FIG. 3 is a laser pump scheme diagram of a prior art ytterbium-erbium inter-ionic energy transfer eye-safe laser.

In FIG. 3, which is a laser pump scheme diagram of a prior art ytterbium-erbium inter-ionic energy transfer eye-safe laser, a 940 nanometer pump source 28 is used to populate the $^2F_{5/2}$ energy level in the ytterbium ion 26. A non-radiative inter-ionic energy transfer 30 occurs, which excites the $^4I_{11/2}$ erbium ion 36 energy level. A fast relaxation occurs, thus populating the $^4I_{13/2}$ erbium level. The resulting laser action 34 produces a 1600 nanometer eye-safe beam. The problem with this pumping approach is the low efficiency of the energy transfer. In crystal hosts such as YAG the significant back-transfer diminishes the conversion efficiency to even lower levels than in glass. One significant contributing factor to this efficiency reduction is the considerably longer lifetime of the $^4I_{11/2}$ level in crystals as compared to phosphate glass, for example [2]. The inefficiency of this inter-ionic energy transfer results in significant heating of the host material preventing scaling to higher operating powers.

Figure 4:
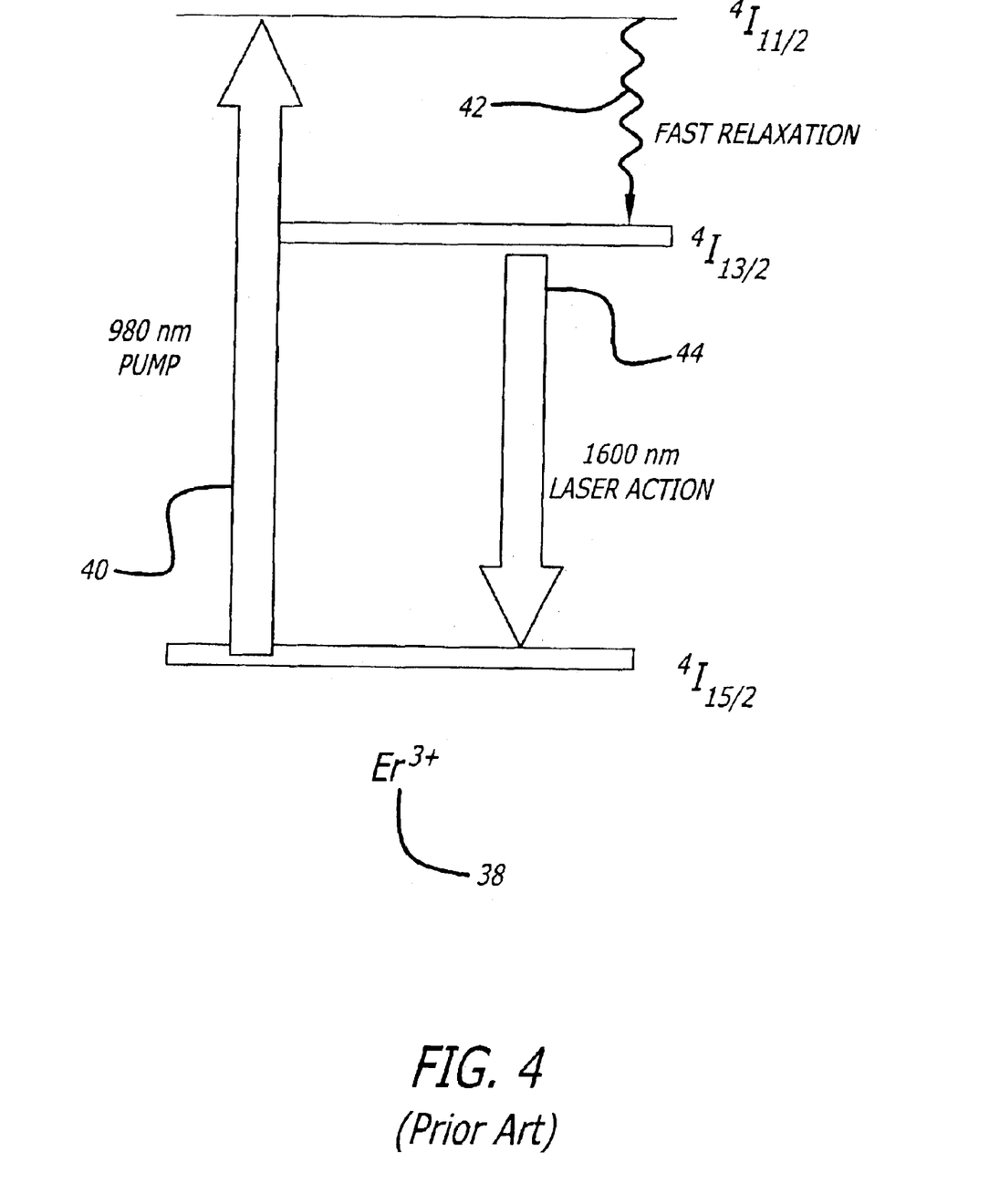
FIG. 4 is a laser pump scheme diagram of a prior art direct conversion, with state transition, erbium eye-safe laser.

FIG. 4 illustrates a laser pump scheme diagram of a prior art direct conversion, with $^4I_{11/2}$ and $^4I_{13/2}$ energy level excitation in an erbium eye-safe laser. The approach in FIG. 4 represents a more favorable pumping scheme that excites the $^4I_{11/2}$ level of the erbium ion 38 directly via the 980 nanometer pumping 40. With this approach, the lossy inter-ionic energy transfer mechanism is avoided. A relaxation 42 of the $^4I_{11/2}$ level to the $^4I_{13/2}$ level occurs. The resultant laser action produces a 1600 nanometer beam. The problem with this pumping scheme, however, is the very low absorption cross-section for the $^4I_{15/2}$ to $^4I_{11/2}$ transition.

Since the erbium doping concentration cannot be increase to more than 1% or so due to severe up-conversion and concentration quenching losses, the only mitigating approach is to employ an extremely long absorption length for efficiently depositing the 980 nanometer pump 40 into the erbium lasing energy levels. This has been successfully done in erbium doped optical fiber where the absorption length can be several meters. Numerous telecommunication grade erbium doped fiber amplifiers (EDFAs), as well as commercially available Er:Fiber lasers with greater than 10 Watts output capability are based on this technology.

Although the more common hosts such as YAG have a significantly longer $^4I_{11/2}$ lifetime, as compared to phosphate glass, there are other promising hosts. These hosts include Y$_2$SiO$_5$ (YSO), Sc$_2$SiO$_7$, Sc$_2$SiO$_5$, Ca$_2$Al$_2$SiO$_7$ (CAS), Ca$_2$Ga$_2$SiO$_7$(CGS), YVO$_4$ and BeAl$_2$O$_4$, in which this $^4I_{11/2}$ lifetime can be much shorter, thus, providing potentially improved efficiency in this pumping scheme. Table 1, below lists these potential hosts and their corresponding energy level lifetimes.

TABLE 1

| Crystal Host | Er $^4I_{13/2}$ Lifetime (ms) | Er $^4I_{11/2}$ Lifetime (ms) |
|---|---|---|
| $Sc_2SiO_7$ | 6.6 | 0.0056 |
| $Sc_2SiO_5$ | 5.6 | 0.0089 |
| $Y_2SiO_5$ (YSO) | 8 | 0.016 |
| $Ca_2Al_2SiO_7$ (CAS) | 7.6 | 0.041 |
| $Ca_2Ga_2SiO_7$ (CGS) | 6.4 | 0.08 |
| $YVO_4$ | 2.5 | 0.03 |
| $BeAl_2O_4$ | 5 | 0.008 |
| YAG | 8 | 0.1 |

The present invention solves the problems in the prior art by integrating two technological approaches. In the illustrative embodiment, the pump source is the very efficient neodymium or ytterbium laser and the energy conversion is accomplished with a second laser that is an intra-cavity pumped erbium laser, which provides the energy storage/boost capability, as well as directly generating the eye-safe output. In this way, two laser technologies are synergistically combined so that both the desired energy boost, for a reduced number of diode pump sources, as well as the direct eye-safe laser generation with an inherently good beam quality are realized.

In an illustrative embodiment, the present invention teaches an intra-cavity pumped Er:Crystal laser that provides efficient energy conversion of the already very efficient diode-pumped 1 micron Nd:YAG, Nd:YVO$_4$, or Yb:YAG lasers without the need to employ non-linear frequency converters. More importantly, the Er:Crystal is an efficient energy storage medium so that a significant reduction in the number of diodes or diode bars can be employed while still providing high power output levels. This translates into a practical, low cost, device that can be implemented in a variety of platforms that benefit from low power and low cost eye-safe laser sources. Furthermore, because the present invention utilizes an intra-cavity energy conversion that is inherently compact and low-cost, it allows for significant scaling of the output energy and power with greatly reduced numbers of diode pump sources. The intra-cavity pump scheme, with appropriate Er:Crystals, will also provide for efficient generation of ultra-short Q-switched pulse operation of these lasers.

Figure 5:
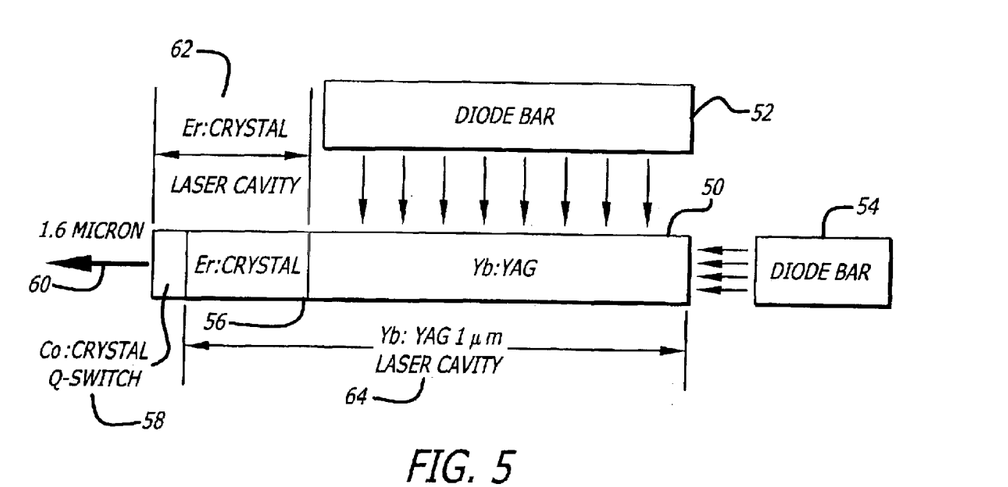
FIG. 5 is a functional block diagram of an eye-safe laser according to an illustrative embodiment of the present invention.

The illustrative embodiment of the present invention implements an intra-cavity pumping scheme where the absorption length of the Er:Crystal medium is essentially increased many-fold because of repeated round-trip passing of the pumplight through the medium. Transmissive/reflective coatings are applied at the cavity ends to manage the transmission and reflection of the different spectra. With this approach, an efficient direct-pumped Er:Crystal eye-safe laser is possible. Reference is directed to FIG. 5, which is a functional block diagram of an eye-safe laser according to an illustrative embodiment of the present invention. The quasi-mono-block structure is comprised of an Yb:YAG laser 54, an Er:Crystal laser 56 and a Co:Crystal Q-Switch 58 assembled into a single structure. Through application of dielectric coatings (not shown), two resonant laser cavities are defined. The first cavity is the Yb:YAG cavity 64. The second cavity is the Er:Crystal laser cavity 62. Diodes bars 52, 54 are positioned to edge pump 52 or end pump 54 the Yb:YAG laser cavity. A first dielectric coating that is transmissive at the pumplight wavelength (940 nanometers) and reflective at the Yb:YAG laser wavelength (1 micron) is disposed on the end of the Yb:YAG medium adjacent to diode bar 54. A second dielectric coating that is reflective at the Yb:YAG laser wavelength (1 micron) and transmissive at the Er:Crystal laser wavelength (1.6 micron) is disposed between the Er:Crystal medium and the Co:Crystal Q-switch. These two coating define the extent of the Yb:YAG laser cavity 64. Similarly, a third reflective coating that is transmissive at the Yb:YAG laser wavelength (1 micron) and reflective at the Er:Crystal wavelength (1.6 micron) is disposed between the Yb:YAG medium 50 and the Er:Crystal medium 56. An output coupler coating is disposed on the face of the Q-switch. The output coupler coating and the third coating define the extent of the Er:Crystal laser cavity 62.

In operation, the diode bars 52, 54 are pulsed by a capacitive discharge power supply at a repetition rate on the order of tens of hertz to inject pumplight energy into the Yb:YAG medium 50. The Yb:YAG medium 50 is thereby excited and lases at 1 micron. The 1 micron laser energy excites the Er:Crystal medium 56, which lases at 1.6 microns. The 1.6 micron energy resonantly reflects within the Er:Crystal laser cavity 62. As energy builds, the Co:Crystal Q-switch 60 is bleached, and when this occurs, the 1.6 micron energy is emitted through the Q-switch 58 as a pulse of laser light 60.

It is worthwhile noting that the energy output for this intra-cavity pumped Er:Crystal laser can be increased ten-fold as compared to the Nd:YAG laser with an intra-cavity pumped OPO utilizing the same power diode pump sources. This is illustrated in the Table 2, below.

TABLE 2

| Eye-Safe Laser System | Nominal Pulse Energy (J) | Optical-Optical Efficiency | Diode Bar Power | Upper Laser Level Lifetime Diode Pump Pulse Duration (S) | Number of Diode Bars Required |
|---|---|---|---|---|---|
| Nd-OPO | 0.01 | 0.07 | 70 | 0.0002 | 10 |
| I/C Er:Crystal | 0.01 | 0.03 | 70 | 0.008 | 1 |

Note that in Table 2, even at an assumed 3% optical-optical efficiency for the intra-cavity (I/C) Er:Crystal laser, the projected diode bar requirement is decreased ten-fold.

Figure 6:
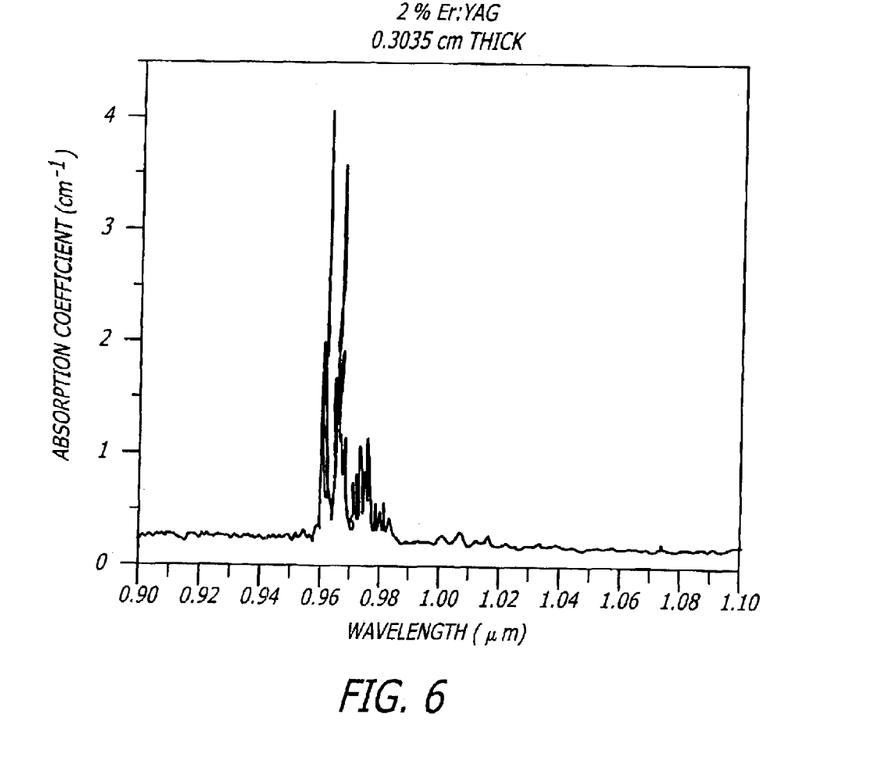
FIG. 6 is an absorption diagram for an erbium ion doped yttrium aluminum garnet laser medium according to an illustrative embodiment of the present invention.

Reference is directed to FIG. 6, which is an absorption diagram for an erbium ion doped yttrium aluminum garnet laser medium according to an illustrative embodiment of the present invention. As can be noted, the main absorption peak lies between 960 nanometer and 990 nanometer, which can be accessed by the ytterbium laser. However, other absorption peaks are present at or longer than 1 microns such that neodymium and/or ytterbium lasers can be utilized. Ultimately, more favorable hosts for the erbium, as noted herein can be evaluated spectrally in order to ascertain the most favorable 1-micron intra-cavity-pumping configuration.

Thus, the present invention has been described herein with reference to a particular embodiment for a particular application. Those having ordinary skill in the art and access to the present teachings will recognize additional modifications, applications and embodiments within the scope thereof.

It is therefore intended by the appended claims to cover any and all such applications, modifications and embodiments within the scope of the present invention.

Accordingly,

What is claimed is:

1. A pumplight driven solid-state eye-safe laser, comprising:
   a first lasing medium operable to lase energy at a first wavelength;
   a second lasing medium coupled with said first lasing medium and defining a first resonant cavity for reflectively retaining said first wavelength energy therein, said second lasing medium operable to lase energy at a second wavelength within the eye-safe band of wavelengths;
   a transmissive/reflective layer disposed along a coupling between said first lasing medium and said second lasing medium, said layer being transmissive at said first wavelength and reflective at said second wavelength, thereby defining a second cavity for reflectively retaining said second wavelength within said second lasing medium; and
   an output coupler disposed at an end of said second lasing medium opposite said transmissive/reflective layer.

2. The laser of claim 1 wherein said first and second lasing mediums are solid state materials.

3. The laser of claim 1 wherein said first lasing medium is neodymium ion doped yttrium aluminum garnet and the pumplight wavelength is approximately eight hundred nanometers.

4. The laser of claim 1 wherein said first lasing medium is ytterbium ion doped yttrium aluminum garnet and the pumplight wavelength is approximately nine hundred and forty nanometers.

5. The laser of claim 1 wherein said second lasing medium is erbium ion doped yttrium aluminum garnet.

6. The laser of claim 1 wherein said second lasing medium an erbium ion doped host material that is selected from one of the following materials: $Sc_2SiO_7$; $Sc_2SiO_5$; $Y_2SiO_5$; $Ca_2Al_2SiO_7$, $YVO_4$, $BeAl_2O_4$, or similar solid-state materials.

7. The laser of claim 1 wherein said first wavelength is approximately 1 micron.

8. The laser of claim 1 wherein said second wavelength is approximately 1.5 microns.

9. The laser of claim 1 wherein said second wavelength is in the range from approximately 1.4 microns to 1.8 microns.

10. The laser of claim 1 wherein pumplight energy is provided by a high power diode bar array.

11. The laser of claim 1 wherein pumplight energy is pulsed.

12. The laser of claim 1 further comprising a Q-switch disposed between said second lasing medium and said output coupler.

13. The laser of claim 12 wherein said Q-switch is a saturable absorber Q-switches.

14. The laser of claim 1 wherein said transmissive/reflective layer is a dielectric coating.

15. The laser of claim 1 further comprising a dielectric coating that is reflective at said first wavelength positioned at the opposite end of said first lasing medium from said transmissive/reflective layer.

16. The laser of claim 12 further comprising a dielectric coating that is reflective at said first wavelength and transmissive at said second wavelength disposed between said second lasing medium and said Q-switch.

17. The laser of claim 1 wherein the laser operates in a pulsed mode of operation.

18. A solid-state eye-safe laser, comprising:
   a pumplight array of high power light emitting diodes that emit pulsed energy at a wavelength of approximately 940 nanometers;
   a first lasing medium formed from solid state ytterbium ion doped yttrium aluminum garnet that operates to lase energy at a first wavelength of approximately one micron as a result of absorbing said pumplight energy;
   a second lasing medium formed from erbium ion doped crystal or erbium ion doped ytterbium aluminum garnet that is coupled with said first lasing medium, together defining a first resonant cavity for reflectively retaining said first wavelength energy therein, said second lasing medium operable to lase energy at a second wavelength approximately 1.5 to 1.6 microns as a result of absorbing said first wavelength energy;
   a first dielectric coating disposed along the coupling between said first lasing medium and said second lasing medium, said first dielectric coating being transmissive at said first wavelength and reflective at said second wavelength, thereby defining a second cavity for reflectively retaining said second wavelength within said second lasing medium;
   a second dielectric coating that is reflective at said first wavelength positioned at the opposite end of said first lasing medium from said first dielectric coating;
   a third dielectric coating that is reflective at said first wavelength and transmissive at said second wavelength disposed at the opposite end of said second lasing medium from said first dielectric coating; and
   a cobalt crystal Q-switch disposed at said end of said second lasing medium beyond said third dielectric coating, said Q-switch absorptive at said second wavelength until switched by bleaching action to a transmissive state, thereby allowing said second wavelength energy to exit said second cavity as a pulse of laser light.

19. A method of producing a pumplight driven eye-safe laser beam utilizing first and second lasing mediums with a transmissive/reflective layer disposed therebetween, and a Q-switch, comprising the steps of:
   lasing the first lasing medium to produce energy at a first wavelength through absorption of pumplight energy coupled thereinto;
   reflectively retaining said first wavelength energy in the resonant cavity defined by the extent of the first and second lasing medium;
   lasing the second lasing medium to produce energy at a second wavelength within in the eye-safe band of wavelengths, through absorption of said first wavelength energy by the second lasing medium;
   reflectively retaining said second wavelength energy in the second resonant cavity formed between the transmissive/reflective layer at one end of the second lasing medium and the Q-switch at the opposite end of the second lasing medium, wherein the transmissive/reflective layer is transmissive at said first wavelength and reflective at said second wavelength; and
   switching the Q-switch from an absorptive state to a transmissive state, thereby emitting said second wavelength energy.

20. The method of claim 19 wherein said first and second medium lasing steps occur in solid state materials.

21. The method of claim 19 wherein said first lasing step occurs in a medium that is neodymium ion doped yttrium aluminum garnet and the pumplight wavelength is approximately eight hundred nanometers.

22. The method of claim 19 wherein said first lasing step occurs in a medium that is ytterbium ion doped yttrium aluminum garnet and the pumplight wavelength is approximately nine hundred and forty nanometers.

23. The method of claim 19 wherein said second lasing step occurs in a medium that is an erbium ion doped crystal.

24. The method of claim 19 wherein said first wavelength is approximately 1 micron.

25. The method of claim 19 wherein said second wavelength is approximately 1.5 microns.

26. The method of claim 19 wherein said second wavelength is in the range from approximately 1.4 microns to 1.8 microns.

27. The method of claim 19 wherein the pumplight energy is coupled from a high power diode bar array.

28. The method of claim 19 further comprising the step of pulsing the pumplight energy.

29. The method of claim 19 wherein said transmissive/reflective layer is a dielectric coating.

30. The method of claim 19 further comprising the step of pulsing the laser with plural repetitions of said switching step.

* * * * *